(12) United States Patent
Nagamori et al.

(10) Patent No.: US 11,913,877 B2
(45) Date of Patent: Feb. 27, 2024

(54) REAL-TIME SPECTRAL ANALYSIS THROUGH HIGH-SPEED SPECTRAL CLASSIFICATION

(71) Applicant: JASCO Corporation, Tokyo (JP)

(72) Inventors: Koshi Nagamori, Tokyo (JP); Kenichi Akao, Tokyo (JP); Kohei Tamura, Tokyo (JP); Miyuki Kanno, Tokyo (JP); Toshiyuki Nagoshi, Tokyo (JP)

(73) Assignee: JASCO Corporation, Tokyo (JP)

( * ) Notice: Subject to any disclaimer, the term of this patent is extended or adjusted under 35 U.S.C. 154(b) by 1034 days.

(21) Appl. No.: 16/640,757

(22) PCT Filed: Aug. 10, 2018

(86) PCT No.: PCT/JP2018/030028
§ 371 (c)(1),
(2) Date: Oct. 30, 2020

(87) PCT Pub. No.: WO2019/039313
PCT Pub. Date: Feb. 28, 2019

(65) Prior Publication Data
US 2021/0055211 A1    Feb. 25, 2021

(30) Foreign Application Priority Data
Aug. 24, 2017   (JP) ................ 2017-161341

(51) Int. Cl.
*G01N 21/35* (2014.01)
*G06N 3/08* (2023.01)

(52) U.S. Cl.
CPC .............. *G01N 21/35* (2013.01); *G06N 3/08* (2013.01); *G01N 2201/064* (2013.01); *G01N 2201/0636* (2013.01); *G01N 2201/12* (2013.01)

(58) Field of Classification Search
CPC .......... G01N 21/35; G01N 2201/0636; G01N 2201/064; G01N 2201/12; G01N 21/65; G01N 21/3563; G06N 3/08; G06N 3/045
See application file for complete search history.

(56) References Cited

U.S. PATENT DOCUMENTS

| | | | |
|---|---|---|---|
| 9,110,001 B2 | 8/2015 | Green et al. | |
| 2013/0096883 A1* | 4/2013 | Bradley | G01J 3/2803 |
| | | | 702/189 |

(Continued)

FOREIGN PATENT DOCUMENTS

| | | | | |
|---|---|---|---|---|
| CN | 102187202 | * | 9/2011 | .......... G01N 21/359 |
| JP | 2016-528496 A | | 9/2016 | |
| JP | 6295474 B2 | | 3/2018 | |

OTHER PUBLICATIONS

International Search Report (ISR) dated Oct. 30, 2018 filed in PCT/JP2018/030028.

(Continued)

*Primary Examiner* — Tung S Lau
(74) *Attorney, Agent, or Firm* — RANKIN, HILL & CLARK LLP

(57) ABSTRACT

The present invention relates to an improvement in spectral analysis in spectrometry, particularly in a technique of spectral analysis by spectral classification at high speed.
A spectral analysis device 10 comprises: a measurement unit 20 that measures a sample spectrum of a target sample 30; and an analysis unit 40 that analyses the sample spectrum, and analyses a compound contained in the target sample 30, wherein
the analysis unit has a library that is processed with an arithmetic processing in advance, the library has a plurality of compound groups to which the compound is classified, and
the analysis unit further comprises an analysis display part 42, the analysis display part 42 displays, in real time, (Continued)

the compound group to which the compound belongs during analysis of the sample spectrum as the analysis progress or analysis result.

20 Claims, 6 Drawing Sheets

(56) References Cited

U.S. PATENT DOCUMENTS

2015/0233762 A1  8/2015  Goldring et al.
2017/0242234 A1  8/2017  Ashcroft et al.

OTHER PUBLICATIONS

Klawun et al., "Neural Network Assisted Rapid Screening of Large Infrared Spectral Databases", Analytical Chemistry, Jan. 15, 1995, vol. 67, No. 2, pp. 374-378; Cited in ISR.

Le et al., "Coal analysis based on visible-infrared spectroscopy and a deep neural network", Infrared Physics & Technology, Jul. 11, 2018, vol. 93, pp. 34-40; Cited in ISR.

Acquarelli et al., "Convolutional neural networks for vibrational spectroscopic data analysis", Analytica Chimica Acta, Dec. 27, 2016, vol. 954, pp. 22-31; Cited in ISR.

Liu et al., "Deep Convolutional Neural Networks for Raman Spectrum Recognition: A Unified Solution", arXiv, Aug. 18, 2017, pp. 1-14; Cited in ISR.

* cited by examiner

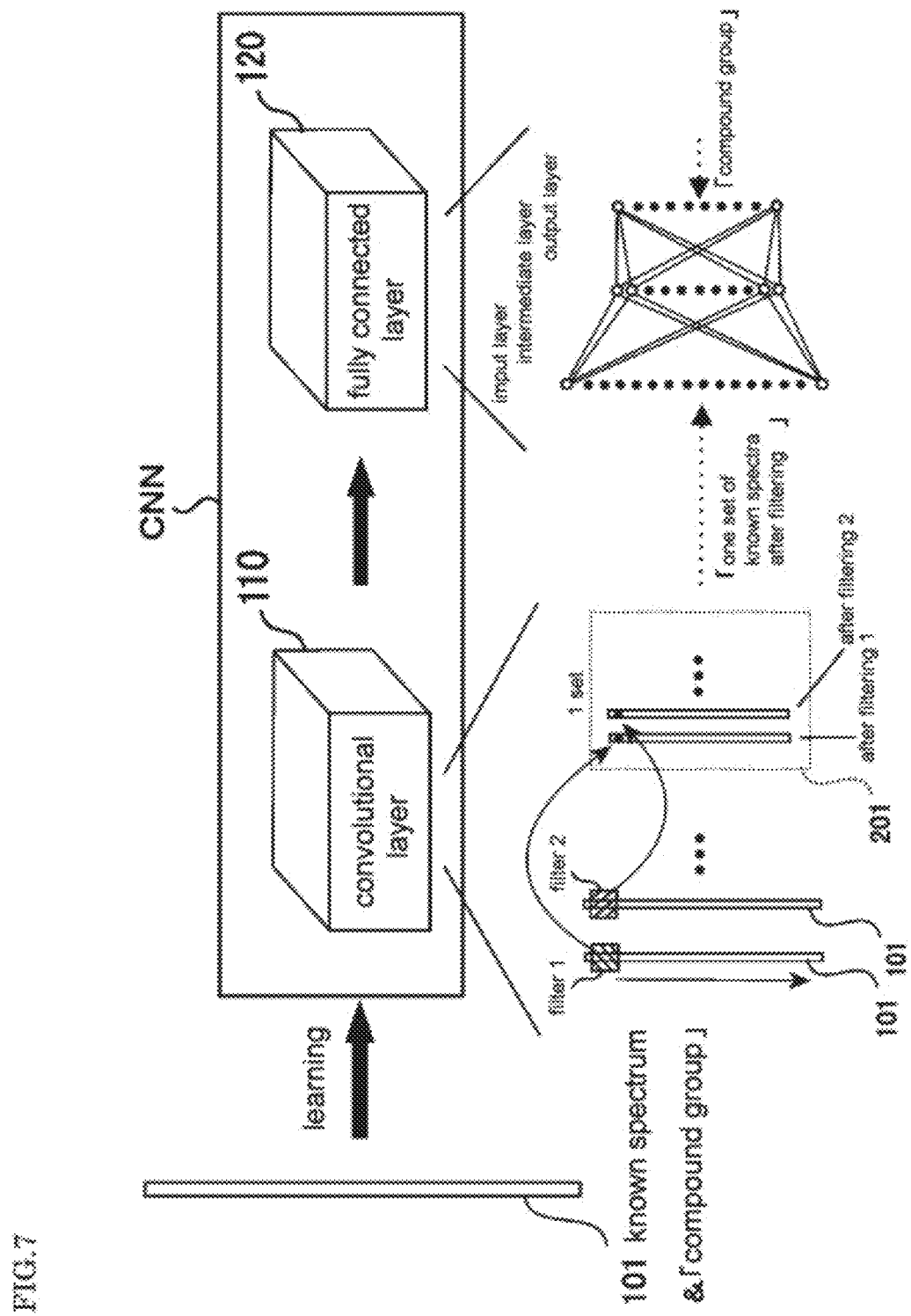

REAL-TIME SPECTRAL ANALYSIS THROUGH HIGH-SPEED SPECTRAL CLASSIFICATION

RELATED APPLICATIONS

This application claims the priority of Japanese Patent Application No. 2017-161341 filed on Aug. 24, 2017, the disclosure of which is incorporated herein by reference in its entirety.

FIELD OF THE INVENTION

The present invention relates to improvement in spectral analysis, particularly in a spectral analysis technique by high-speed spectral classification.

BACKGROUND OF THE INVENTION

Infrared spectrometry and Raman spectrometry are generally known as means for qualitative analysis to confirm what kind of components are contained in a target sample. In such spectrometry, a standard spectrum of each substance (also referred to as a known spectrum) and a sample spectrum of which the feature of the target sample is shown are compared to identify the sample in accordance with its degree of coincidence and the like.

In infrared spectrometry, for example, integration needs to be performed for several times to obtain a good sample spectrum; therefore, it takes a long time particularly in mapping measurement. Similarly, in Raman spectrometry, a long exposure time is necessary to obtain a good sample spectrum; therefore, it takes a long time in measurement. Moreover, a huge amount of standard spectra and sample spectra needs to be compared to obtain an analysis result; and when the analysis result is used to create a chemical image that shows the feature of the sample, it could take more time.

Accordingly, Patent Literature 1 discloses a technique in which a user creates a watchlist for tagging substances, and uses the watchlist for searching (or analyzing) substances performed by an application, so that a measurement result that the user demands can be obtained faster than before. The tagged substances (watchlist substances) in Patent Literature 1 are substances that the user either has reason to believe that might be present in the sample or are substances of such concern that the user wants to check for them in detail even if they have no prior information to suggest that they are present.

That is, in Patent Literature 1, failures in searching for the substance that the user demands can be prevented, and a quick measurement is possible by preferentially searching the substance tagged in advance, not by randomly searching the substance from a huge amount of database.

CITATION LIST

Patent Literature

PATENT LITERATURE 1: Japanese Patent No. 6295474 B

DISCLOSURE OF THE INVENTION

Problem to be Solved by the Invention

As in Patent Literature 1, however, the measurement result can be obtained quickly according to the user's demand by using the watchlist (tagging the target substance). However, if the tagged substance is not contained in a sample spectrum, for example, a search needs to be performed from a huge amount of database, and it could take a lot of time as before to obtain an accurate measurement result.

Means to Solve the Problem

The present invention has been accomplished in view of the above-mentioned conventional art, and an object thereof is to provide a spectral analysis device and a spectral analysis method that can achieve classification of a compound group at a higher speed than before.

In order to solve the above-mentioned problem, a spectral analysis device according to the present invention comprises:
   a measurement unit that measures a sample spectrum of a target sample; and an analysis unit that analyzes the sample spectrum; the spectral analysis device that identifies a compound contained in the target sample, wherein
   the analysis unit has a library processed with an arithmetic processing in advance, the library has a plurality of compound groups to which the compound is classified, and
   the analysis unit further comprises an analysis display part, the analysis display part displays, in real time, the compound group to which the compound belongs during analysis of the sample spectrum as an analysis progress or an analysis result.

In the spectral analysis device according to the present invention,
   after the compound group to which the target sample belongs is identified by the spectral analysis device, the sample spectrum is used to identify a specific compound contained in the target sample at pinpoint.

In the spectral analysis device according to the present invention,
   the library is a learned library that has machine-learned by teacher data in advance,
   at least a part of the analysis unit comprises a neutral network, and the neutral network uses the learned library to identify the compound group to which the compound contained in the target sample belongs from the sample spectrum.

In the spectral analysis device according to the present invention,
   the neutral network comprises a convolutional neutral network.

In the spectral analysis device according to the present invention,
   the library is a mean library that comprises a mean spectrum obtained by averaging a group of known spectra, and
   the analysis unit uses the mean library to identify the compound group to which the compound contained in the target sample belongs.

In the spectral analysis device according to the present invention,
   the library is a small library composed of 100 or less of the group of known spectra, and
   the analysis unit uses the small library to identify the compound group to which the compound contained in the target sample belongs.

In the spectral analysis device according to the present invention, the measurement unit can perform mapping measurement by spectrometry, and the analysis unit creates, in real time, a chemical image of the compound group contained in the target sample from a group of the sample spectra obtained by mapping measurement.

In the spectral analysis device according to the present invention, the sample spectrum is a rough spectrum that can be obtained faster than a complete spectrum of which the feature of the target sample is clearly shown, and has a minimum necessary information for classifying the compound group.

In the spectral analysis device according to the present invention, after identifying the compound group to which the target sample belongs by the spectral analysis device, spectral measurement is performed again to measure the complete spectrum, and the complete spectrum is used to identify a specific compound contained in the target sample at pinpoint.

Moreover, a spectral analysis method according to the present invention uses a sample spectrum of a target sample measured by a measurement unit, and an analysis unit that analyzes the sample spectrum to identify a compound contained in the target sample, the method comprising steps of;

measuring a rough spectrum that can be obtained faster than a complete spectrum of which the feature of the target sample is clearly shown, and has a minimum necessary information for classifying the compound group by the measurement unit, classifying the compound contained in the target sample to a compound group by using a library processed with an arithmetic processing in advance by the analysis unit, and displaying, in real time, the compound group to which the compound belongs during analysis of the sample spectrum as an analysis progress or an analysis result to an analysis display part of the analysis unit.

Moreover, a program for executing the analysis unit according to the present invention is a program that uses a sample spectrum of a target sample measured by a measurement unit to execute an analysis unit that identifies a compound contained in the target sample, the program makes the analysis unit to execute steps of:

measuring a rough spectrum that can be obtained faster than a complete spectrum of which the feature of the target sample is clearly shown, and has a minimum necessary information for classifying the compound group by the measurement unit, classifying the compound contained in the target sample to the compound group by using a library processed with an arithmetic processing in advance by the analysis unit, and displaying, in real time, the compound group that the compound belongs to during analysis of the sample spectrum as an analysis progress or an analysis result onto an analysis display part of the analysis unit.

Effect of the Invention

According to the present invention, an effect of classifying the compound group at a higher speed than before can be exhibited by: providing a measurement unit and an analysis unit having a predetermined library to a spectral analysis device; measuring a specific sample spectrum by the measurement unit; and identifying a compound group to which a compound contained in a target sample by using the sample spectrum. As a result, by providing an analysis display part to the analysis unit of the spectral analysis device, the compound group to which the compound belongs during analysis of the sample spectrum can be displayed, in real time, as an analysis progress or analysis result.

BRIEF DESCRIPTION OF THE DRAWINGS

FIG. 7 shows a schematic image diagram of a convolutional neutral network (CNN).

BEST MODE FOR CARRYING OUT THE INVENTION

Hereinbelow, the spectral analysis device of the present invention is described with reference to the figures; however, the present invention is not limited to the examples given below as long as it is included in the scope of the present invention. That is, the present embodiment mainly describes about infrared spectrometry, however, an effect similar to the present invention may be achieved in Raman spectrometry, for example, or other measurements.

Figure 1:
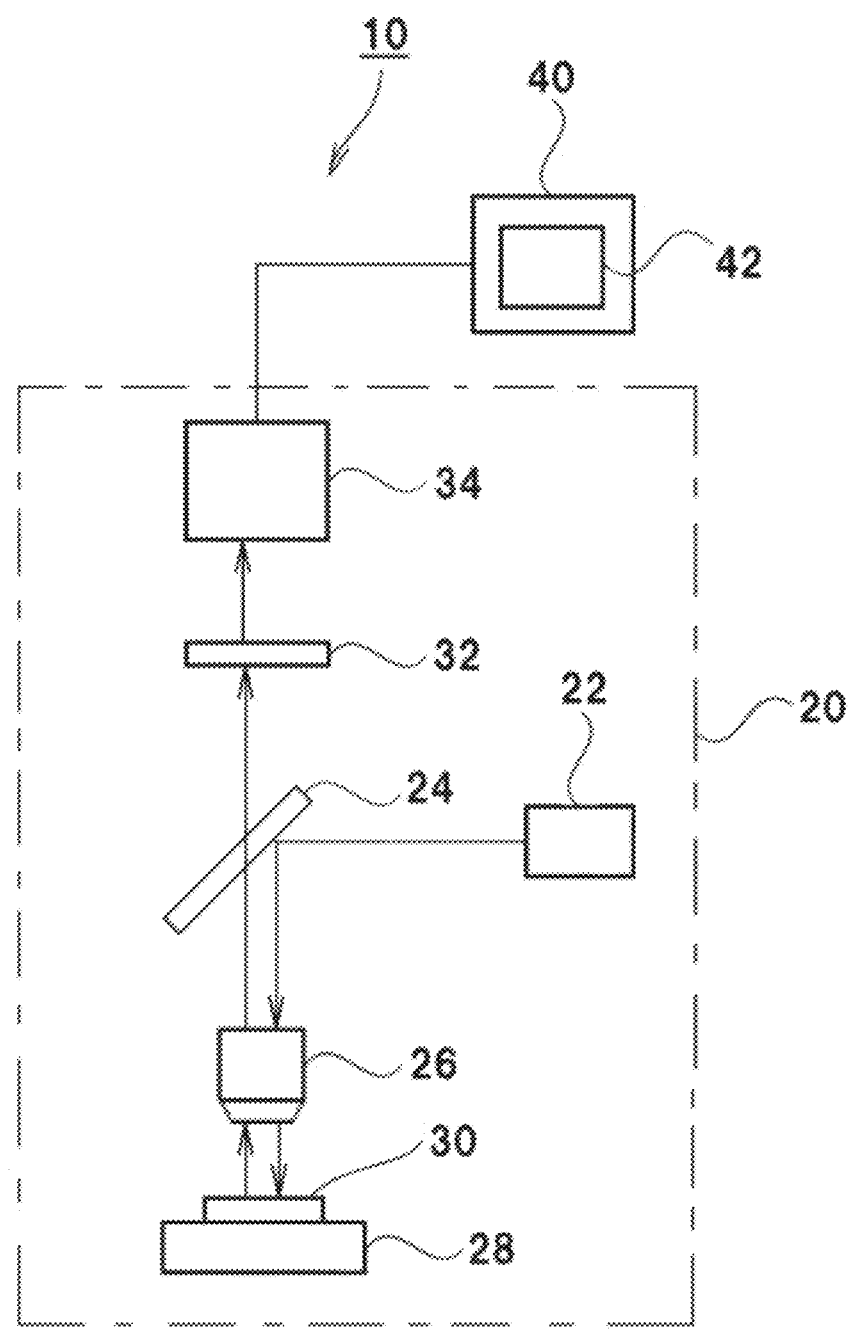
FIG. 1 shows a schematic configuration of a spectral analysis device according to an embodiment of the present invention.

FIG. 1 shows a schematic configuration of a spectral analysis device according to an embodiment of the present invention. This spectral analysis device is a spectral analysis device that a measurement unit for measuring a spectrum of a target sample is integrated therewith. A spectral analysis device 10 shown in FIG. 1 is configured of; an infrared spectroscope 20 as the measurement unit; and a computer device 40 as an analysis unit for analyzing a measurement result measured by the infrared spectroscope 20. Although the infrared spectroscope 20 in FIG. 1 is a microscopic infrared spectroscope, the present invention is not limited thereto.

The infrared spectroscope 20 as the measurement unit is configured of: a light source 22 that emits an infrared light; a reflecting mirror 24 that guides the infrared light toward a sample 30; an objective mirror 26 that sends the infrared light to a predetermined position of the sample 30 and condenses a reflected light from the sample; a movable stage 28 where the sample 30 is placed onto; an aperture 32 that eliminates a specific light that is unnecessary for measurement among the reflected light condensed from the sample; and a detector 34 that detects a spectrum of the reflected light from the sample that has passed through the aperture 32.

The computer device 40 as the analysis unit is connected to the detector 34, and the computer device 40 analyzes the sample spectrum of the reflected light from the sample that is detected by the detector 34. That is, in the spectral analysis device 10 of the present embodiment, the computer device 40 performs a predetermined analysis to obtain a measurement result. Moreover, the computer device 40 comprises an analysis display part 42 for displaying a measurement result obtained by spectral analysis or the like.

The infrared light emitted from the light source 22 is reflected toward the sample 30 by the reflecting mirror 24, and proceeds via the objective mirror 26 to the sample 30. The reflected light from the sample 30 is condensed by the objective mirror 26, and then the reflected light from the sample that passed through the reflecting mirror 24 proceeds via the aperture 32 to the detector 34.

Figure 2:
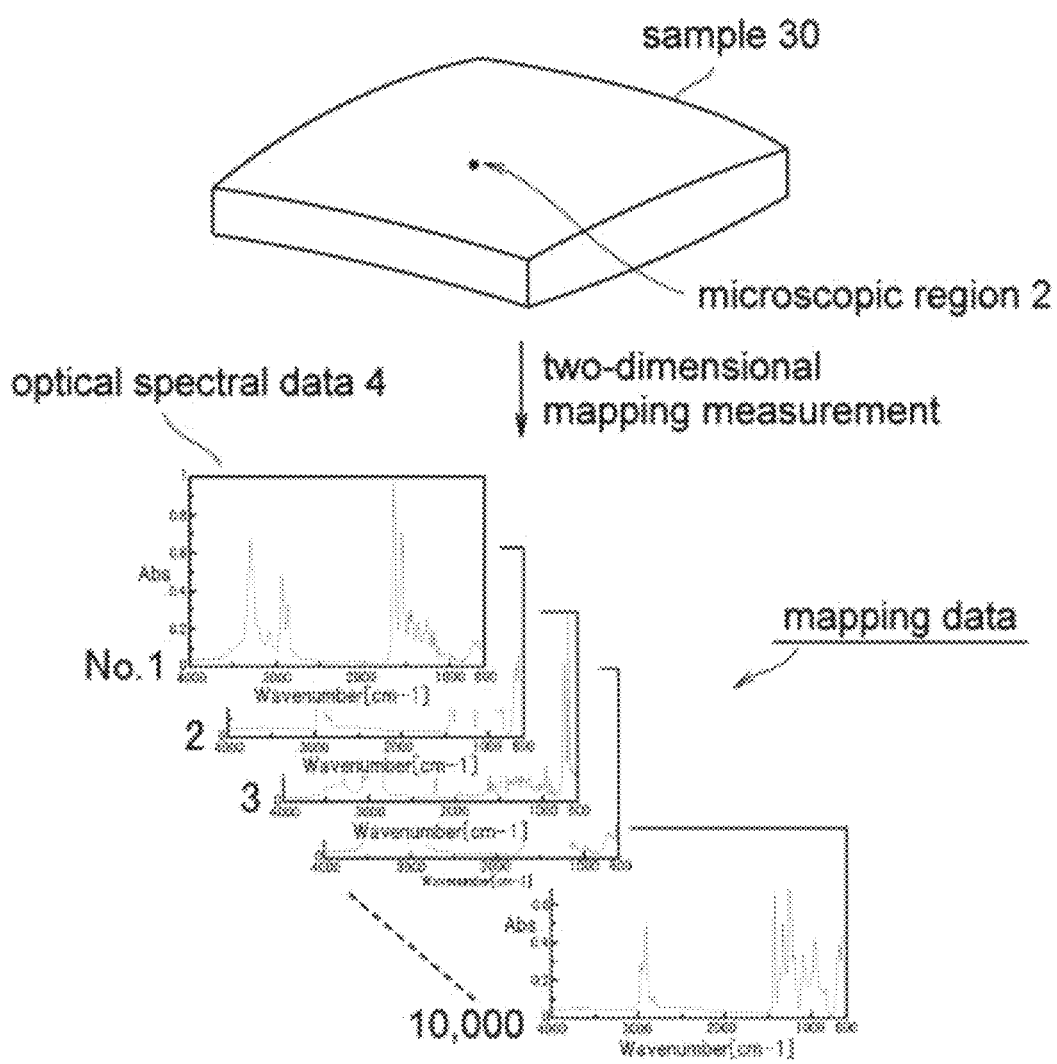
FIG. 2 shows a schematic image diagram of a measurement data in mapping measurement performed by an infrared spectroscope of the present embodiment.

In the present embodiment, a control part (not shown in the drawing) makes the movable stage 28 move to perform a two-dimensional mapping measurement. FIG. 2 shows a schematic image diagram of a measurement data in mapping measurement performed by the infrared spectroscope of the present embodiment. First, an optical spectral data 4 (also referred to as a sample spectrum) is obtained respectively from a microscopic region 2 in the total area of the sample 30 (or a microscopic region 2 in a certain area of the sample 30). In infrared spectrometry, the horizontal axis of the optical spectral data 4 is a wavenumber ($cm^{-1}$), and the vertical axis is an absorbance. By using a large amount of the obtained optical spectral data 4 (also referred to as a mapping data 6), the computer device 40 performs a predetermined processing to create a chemical image (also referred to as a color-coded diagram).

In order to obtain a good sample spectrum in infrared spectrometry, there are cases that integration is repeated for about several tens of times (from about 50 to 200 times) (this is because, in a measurement with fewer times of integration, the feature of the spectrum in the measurement point will not be clear). In such case, spectral measurement takes a lot of time. In a case where integration times is set to about 100 times; when numerous measurement points are measured, for example, the measurement time may be several tens of minutes or more. Similarly, in Raman spectrometry, for example, when an exposure time for each point in mapping measurement is extended, it may take a lot of time.

In general, chemical images are often created by multivariate analysis, for example. This multivariate analysis can be regarded as an excellent means for obtaining an accurate measurement result (chemical image); however, it requires a lot of time to obtain the measurement result since the amount of calculation is tremendous. Moreover, in a case when the chemical image is actually required, an accurate measurement result is not necessarily required, and it is often sufficient if classification of the compound group can be performed in a practical range, for example.

In order to solve such problems, in the present embodiment, the sample spectrum measured with the infrared spectroscope 20 as the measurement unit is devised, and the compound group to which the compound contained in the target sample belongs is identified (classified) by a specific library of the computer device 40 to create a chemical image. Hereinbelow, the sample spectrum and spectral analysis in the present embodiment are described in detail.

<Sample Spectrum>

In the present embodiment, a sample spectrum is obtained by performing mapping measurement with an infrared spectroscope 20. As described above, in order to obtain an accurate measurement result, integration needs to be performed for several times for each point in mapping measurement (in Raman spectrometry, a very long exposure time is required). Therefore, when a general multivariate analysis is used, it takes further time to obtain an analysis result. Thus, even when a user wants to know the measurement result quickly, it is difficult to display, in real time, the analysis progress or analysis result during mapping measurement.

Hence, in the present embodiment, the infrared spectroscope 20 does not measure a complete spectrum of which the feature of the target sample is clearly shown, but measures a rough spectrum that can be obtained faster than the complete spectrum and has a minimum necessary information for classifying the compound group, so that real-time display during mapping measurement or analysis can be achieved.

It is difficult to identify, at pinpoint, the compound such as a foreign substance or the like contained in the target sample with this rough spectrum; however, it is often sufficient which compound group the compound belongs to can be grasped, even if the compound cannot be identified at pinpoint. The present invention focuses on such points, and a practical compound group is "roughly" identified by using the rough spectrum.

<Spectral Analysis>

Figure 3:
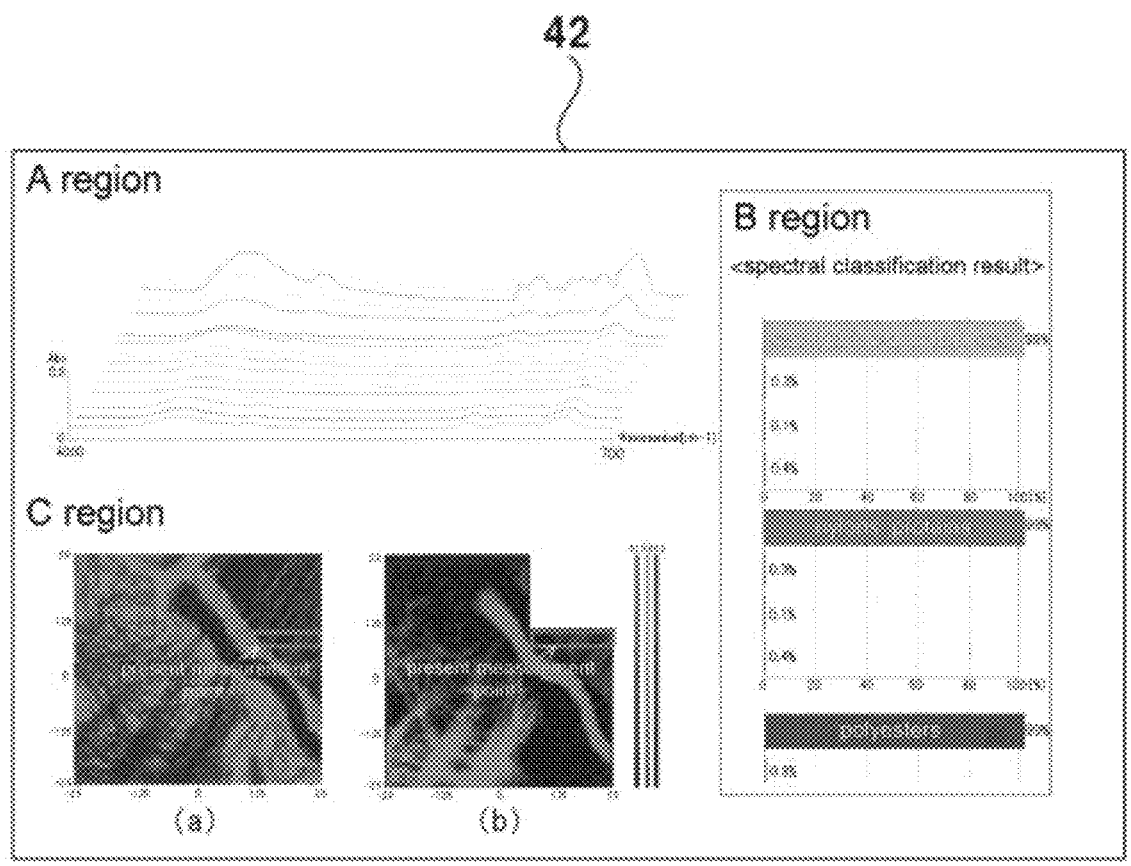
FIG. 3 shows a schematic diagram of creating a chemical image by a real-time measurement in the present embodiment.

FIG. 3 shows a schematic diagram of creating a chemical image by spectral analysis in the present embodiment. FIG. 3 is a schematic diagram of a display screen of the analysis progress or analysis result that is displayed in the analysis display part 42 (refer to FIG. 1) of the computer device 40, and the screen is divided into regions A to C. Hereinbelow, the regions A to C are described for each region.

The region A of FIG. 3 schematically shows the sample spectrum in each point of the sample 30 (optical spectral data 4 in FIG. 2). In the region A, the horizontal axis is the wavenumber, and the vertical axis is the absorbance. Each sample spectrum is to be displayed sequentially in the analysis display part 42 during or after mapping measurement.

In the region B of FIG. 3, during measurement of the sample spectrum (before all of the sample spectra is displayed in the region A), the sample spectrum is classified in real time by using a library processed with a predetermined arithmetic processing in advance. This library has a plurality of compound groups to which the compound contained in the sample 30 is classified.

Specifically, the library comprises compound groups such as "saccharides, celluloses", "nylons, proteins", "polyesters" and the like. Classification to the compound group is started during measurement of the sample spectrum, and the compound group is displayed in real time in the region B as the analysis progress or analysis result.

That is, the computer device 40 according to the present embodiment predicts to which compound group the specific compound contained in the sample spectrum belongs during measurement of the sample spectrum, and, at the same time, classifies in real time. At this point, the compound is not identified at pinpoint, and a practical "rough" classification is performed at a higher speed than before, as described above. As a result, even during measurement of the sample spectrum, the compound group can be identified in real time (and the analysis progress or analysis result during measurement can be displayed in real time).

For example, when classification of the compound group is to be displayed in real time, probabilities of belonging to "saccharides, celluloses", "nylons, proteins", and "polyesters" are respectively displayed as shown in the region B, and it can be set such that its classification becomes apparent as the analysis time passes. That is, display of the probabilities of belonging to respective compound groups continuously change to values that are more accurate during analysis.

Moreover, in the region C of FIG. 3, the compound group identified in the region B is used, so that the chemical image can be created faster than before. As a result, the chemical image can be displayed during measurement of the sample spectrum or during analysis. Specifically, a surface image of the visualized sample is displayed in (a) of the region C in FIG. 3, and, in (b) of the region C, the chemical image is created in real time by using the respective compound groups identified in the region B.

As in the region B, in the real-time display of the chemical image, the respective color coding continuously changes to those that are more accurate. For example, in a case where "saccharides, celluloses" is coded in green, "nylons, proteins" in red, and "polyesters" in blue, when the part which was green in the first half of analysis is found out to be blue in the latter half of analysis, the display of the green part is changed to blue at this stage.

That is, conventionally, the chemical image could not be confirmed unless a specific analysis time has passed after measurement of the sample spectrum; however, in the present embodiment, progress of creation of the chemical image can be confirmed in real time during analysis. As a result, when a foreign substance gets into the target sample, for example, a quick decision can be made during creation of the chemical image.

Figure 4:
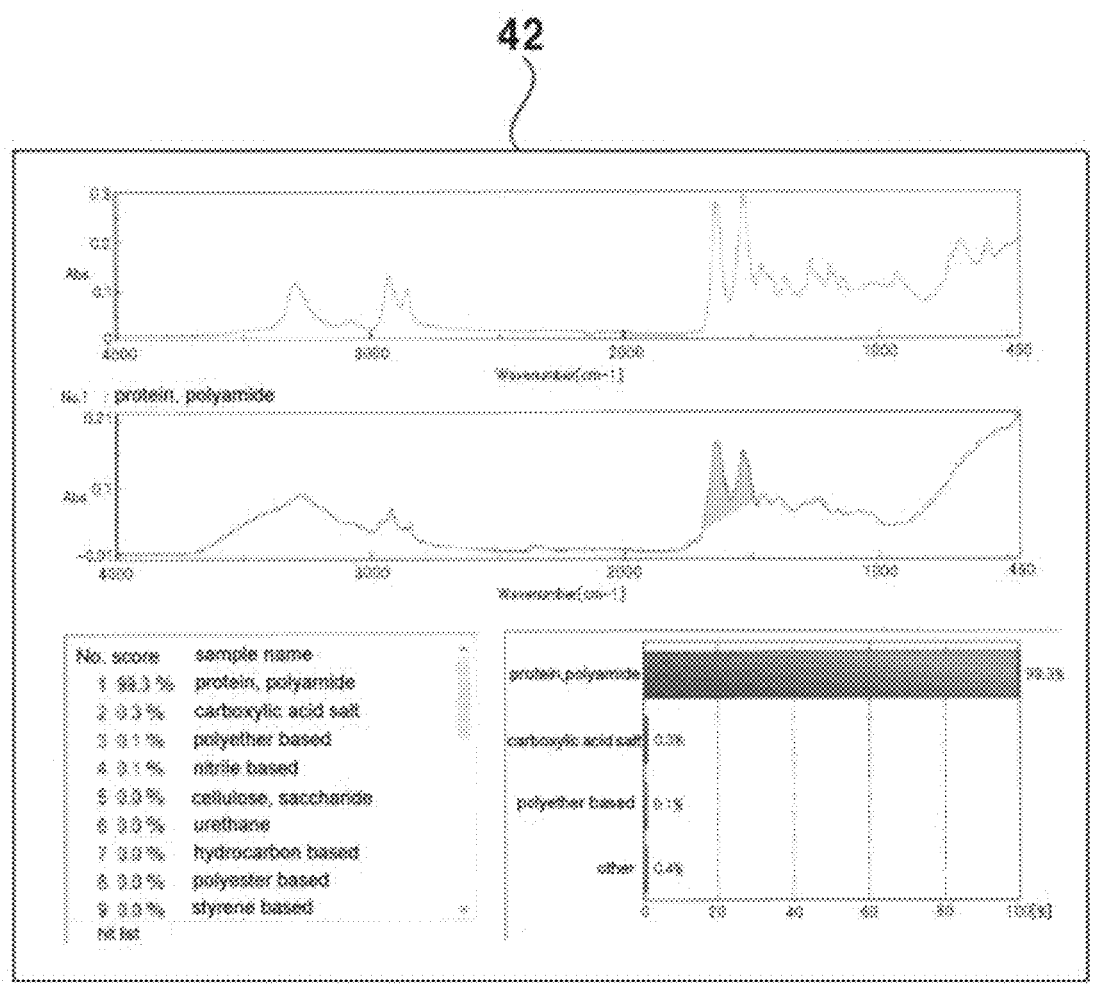
FIG. 4 shows a schematic diagram of an analytical prediction during identification of classifying to compound groups in the present embodiment.

FIG. 4 shows a schematic diagram of an analytical prediction during classification of the compound group of the computer device 40 (analysis unit) according to the present invention. FIG. 4 is a display screen of the analysis progress or analysis result displayed in the analysis display part 42 of the computer device 40 as in FIG. 3. As shown in FIG. 4, results of classifying to the compound groups are predicted and displayed in real time during analysis of the sample spectrum. For example, in FIG. 4, it displays in real time a result that the probability of being "protein, polyamide" is extremely high, and the probabilities of being other groups are extremely low. As the time of the spectral analysis passes, the probabilities that are more accurate than in the first half of the spectral analysis will be displayed in the analytical prediction.

As described above, in the spectral analysis device 10 in the present embodiment, classification of the compound group of the sample spectrum (compound such as foreign substances contained in the sample spectrum) is displayed in real time to the analysis display part 42 by using the library of the analysis unit. This library is processed with a predetermined arithmetic processing in advance, and the library can be constructed by various arithmetic processing in the present embodiment. Hereinbelow, the libraries applicable to the spectral analysis device 10 in the present embodiment are described in detail.

<Learned Library>

Figure 5:
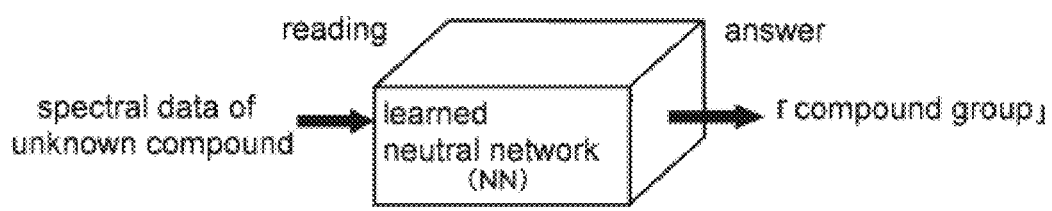
FIG. 5 shows a conceptual diagram of a classification method of an unknown compound group in an analysis unit according to the embodiment of the present invention.

First, a learned library in the present embodiment is described. The learned library is a library that has machine-learned by teacher data in advance. The computer device 40 according to the embodiment of the present invention comprises a neutral network (NN) as shown in FIG. 5. The computer device 40 executes an analysis program (or an analysis program), and makes the learned NN to read a spectral data of an unknown compound (hereinafter referred to as unknown spectrum) and answer the compound group to which the unknown compound belongs.

Figure 6:
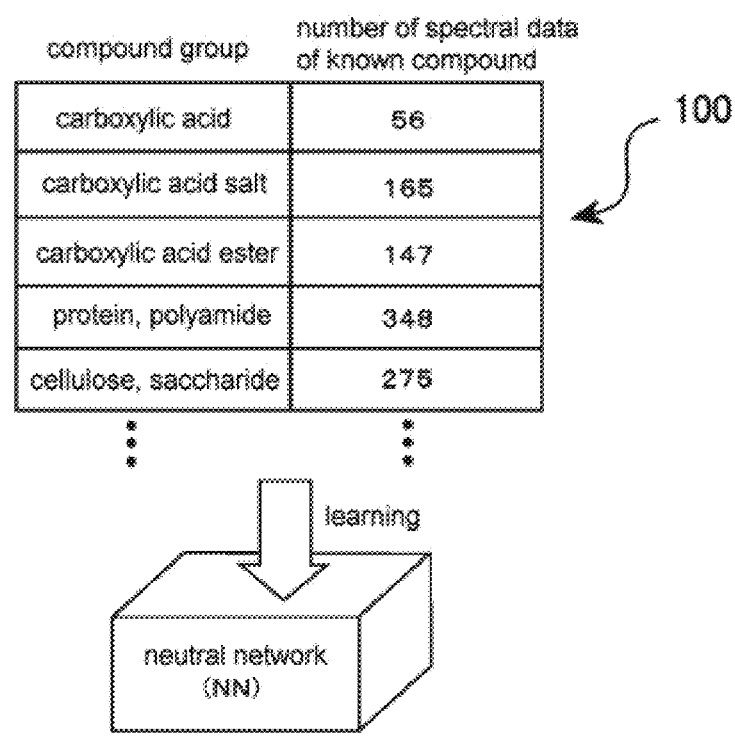
FIG. 6 shows a conceptual diagram that shows how a neutral network (NN) learns a known spectrum by machine learning.

The learned NN is a characteristic NN that has completed machine learning of the present invention. The computer device 40 executes a machine learning program to make the NN learn a spectral data of a known compound (hereinafter referred to as a known spectrum) in order. A numerous known spectral data classified into the compound groups as shown in a teacher data list 100 of FIG. 6 is the target of learning of the NN. In the list, the numbers of data of the known spectra that belong to each compound group are shown.

One that orders the NN to learn sets, as a preliminary stage, categories in accordance with a rule of thumb upon spectral classification. The categories show the compound groups such as "carboxylic acid", "carboxylate", "protein, polyamide" and the like. Furthermore, a sample of the known compound that is empirically accepted to belong to respective compound group is collected, and the spectral data thereof is selected. For the compound group "carboxylic acid" mentioned above, a data of a plurality of the known spectra collected from the samples such as formic acid, acetic acid, butyric acid, and the like, for example, is prepared.

Upon setting the type of the compound group, application of spectral analysis should be considered. For example, in applications of analyzing foreign substances in tap water or food, the types of the compound groups that should be set are often empirically established already, so that the compound group may be set in accordance therewith.

The computer device 40 executes the machine learning program to make the NN read each information of the compound group to which the known spectrum and the known compound belong, and learn by machine learning each information of the known spectrum and the compound group that are read.

Hereinbelow, machine learning that uses a convolutional neutral network (CNN) as the neutral network is given as an example; however, the classification method of the present invention can also be applied to other neutral networks. An example of a procedure of machine learning of the CNN is shown in FIG. 7. The CNN used here is a model of which one layer or more of a convolutional layer 110 and a fully connected layer 120 are combined.

A data 101 of the known spectrum may be a data column of an absorbance data at a measurement wavenumber per 1 $cm^{-1}$, for example. When a measurement wavenumber band is 700 to 3899 $cm^{-1}$, one known spectrum will be a data column of approximately 2000 to 40000.

The convolutional layer 110 is set with n convolutional filters (filter 1, 2, . . . , N). N is a natural number of two or more. These filters are to emphasize the features of spectral shape contained in the known spectrum, and consist of various filters such as "a filter to extract sharp peak shapes", "a filter to smoothen change of the spectrum", and the like. Therefore, in the following fully connected layer 120, the CNN learns a relationship between a data that shows the features of the emphasized spectral shapes, and the compound group to which the known spectrum belongs.

The fully connected layer 120 has a multi-layered configuration of an input layer, an intermediate layer (hidden layer), and an output layer. The number of data of the input layer corresponds to the number of data of one set of the filtered known spectra from the convolutional layer 110. The number of data of the intermediate layer is determined adequately. The number of data of the output data corresponds to the number of the compound groups that are set. In the fully connected layer 120, a weighting parameter is given to each data of the input layer, and the value added together becomes the data of the intermediate layer. Furthermore, a weighting parameter is given to the intermediate layer, and the value added together becomes the data of the output data.

The computer device 40 executes the machine learning program to make n convolutional filtering processing performed. In the convolutional layer 110, n known spectral data after filtering is formed. Such preliminary processing step is executed to all of the known spectra in the teacher data list 100.

Next, the computer device 40 executes the machine learning program to make the fully connected layer 120 learn a group of known spectral data that have been preliminary processed in n way, in another words, one set of known spectral data 201 after filtering. Specifically, one set of known spectral data 201 after filtering is inputted to the input layer. Then, the weighting parameter of the fully connected layer is adjusted such that the output value related to the compound group of the known spectrum shows a maximum value among the output value from the output layer.

Learning is executed at the fully connected layer 120 to all of the known spectra, so that the weighting parameter of the fully connected layer 120 can be optimized, and the compound group to which it belongs can be correctly outputted for every known spectra. The optimized weighting parameter is stored in the computer device 40 as the learned library.

The procedures of classifying an unknown compound by using the CNN of which has completed learning as described above to execute the analysis program with the computer device 40 is as follows.

First of all, the computer device 40 uses n convolutional filters (filter 1, 2, ..., N) to execute a preliminary processing of an unknown spectrum at the convolutional layer 110. By this step, n filtered unknown spectral data is formed.

Subsequently, the computer device 40 makes the input layer of the fully connected layer 120 to read one set of filtered unknown spectra. Then, the computer device 40 makes the output layer of the fully connected layer 120 to read one set of filtered unknown spectra. Then, the computer device 40 answers the compound group to which the unknown spectrum belongs based on the maximum value among the output value from the output layer of the fully connected layer 120.

<Mean Library>

Next, a mean library in the present embodiment is described. The mean library shows features of the compound group by a mean spectrum obtained by averaging a group of the known spectra. Specifically, with respect to a group of the known spectra having a feature as "saccharides", for example, respective spectra are overlapped and averaged to calculate a mean spectrum, and a mean library can be constructed.

This mean library can be produced easily than the abovementioned learned library, and can be used for classifying compound groups in real time in the spectral analysis device 10 of the present embodiment.

<Small Library>

Next, a small library in the present embodiment is described. General libraries are composed of several hundreds or tens of thousands of groups of known spectra; however, the small library as uses herein is a library that is composed of fewer groups of known spectra than usual. The small library is preferably composed of 100 or less of known spectra, more preferably 10 or less known spectra, and particularly preferably 6 or less of known spectra.

Moreover, the known spectra contained in the small library are preferably known spectra that can be used for roughly classifying the compound groups such as saccharides, polyesters and the like, for example.

Similar to the mean library, this small library can be easily produced, and can be used for classifying compound groups in real time in the spectral analysis device 10 of the present embodiment.

As described above, in the present embodiment, each library that has been processed in advance with the predetermined arithmetic processing is employed, so that the compound group to which the compound such as a foreign substance contained in the target sample belongs can be displayed, in real time, as the analysis progress or analysis result. For example, after deciding which library is to be used among the learned library learned by machine learning, the mean library, and the small library, the specific library can be used to classify the compound group.

Moreover, in the present embodiment, the chemical image based on the sample spectrum obtained by mapping measurement performed by infrared spectroscopy is described; however, similar effect can be expected in other analysis such as Raman spectrometry, or in real-time displaying of measurement results other than chemical images.

Furthermore, in the present embodiment, rough spectra (spectra having the minimum necessary information for identifying compound groups, spectra of which features are not clear than complete spectra) are used to identify (to display in real time) "rough" compound groups in a practical range at a higher speed than before; however, by performing mapping measurement again after the compound group to which the sample belongs is identified to obtain complete spectra (spectra of which the feature of the sample is clear), for example, an unknown compound contained in the target sample can be identified faster than before with fewer libraries.

In addition, the compound group is identified by the first spectral analysis in the present embodiment. Therefore, in the following spectral analysis after the compound group is identified, only known spectra that belong to the range of the compound group should be searched. Accordingly, regardless of the sample spectrum (rough spectrum or complete spectrum), the unknown compound can be identified at pinpoint at a higher speed than before. In addition, by repeating spectral analysis for several times, the unknown compound can be identified, at pinpoint, more accurately compared to the analysis result obtained by one spectral analysis.

Needless to say, the spectral analysis device in the present embodiment may be provided separately from the measurement unit (infrared spectroscope). For example, with respect to the sample spectrum measured separately, the compound group of the sample may be identified by the spectral analysis device afterwards. In this case, spectral analysis may be performed by installing a program to a commercially available computer, or the like, for example.

According to the present invention, the spectral analysis method capable of identifying the compound group to which the target sample belongs at a higher speed than before can be performed by: measuring a rough spectrum, that can be obtained faster than a complete spectrum of which the feature of the target sample is clear, the feature of the target sample is unclear, and has the minimum necessary information for classifying the compound group, by the measurement unit; classifying the compound contained in the target sample to the compound groups by using the library processed with an arithmetic processing in advance by the analysis unit; and displaying, in real time, the compound group to which the compound belongs during analysis of the sample spectrum as the analysis progress or analysis result to the analysis display part of the analysis unit.

DESCRIPTION OF REFERENCE SIGNS

2 Microscopic region
4 Optical spectral data
6 Mapping data
10 Spectral analysis device
20 Infrared spectroscope
22 Light source
24 Reflecting mirror
26 Objective mirror
28 Movable stage
30 Sample
32 Aperture
34 Detector
40 Computer device
42 Analysis display part
100 Teacher data list
110 Convolutional layer
120 Fully connected layer
200 One set of filtered known spectra
101 Data column of known spectra (spectral data of known compound)
201 Data column of one set of known spectra after convolutional filtering processing

What is claimed is:

1. A spectral analysis device comprising:
a measurement unit that measures a sample spectrum of the target sample; and
an analysis unit that analyzes the sample spectrum,
wherein the spectral analysis device identifies a compound contained in the target sample,
the analysis unit has a library processed with an arithmetic processing before measuring the sample spectrum of the target sample, the library has a plurality of compound groups to which the compound is classified,
the sample spectrum is a rough spectrum obtained earlier than obtaining a complete spectrum which can pinpoint the compound in the target sample,
the complete spectrum is obtained by repeating integrations at least several times to pinpoint the compound, and the rough spectrum is obtained by fewer integrations than a number of the integrations for obtaining the complete spectrum, and
the analysis unit comprises an analysis display part, the analysis display part displays, in real time, the compound group to which the compound belongs during measurement of the rough spectrum as an analysis progress or an analysis result.

2. The spectral analysis device according to claim 1, wherein
after the compound group to which the target sample belongs is identified by the spectral analysis device, the sample spectrum is used to identify a specific compound contained in the target sample at pinpoint.

3. The spectral analysis device according to claim 1, wherein
the library is a learned library that has machine-learned by teacher data in advance,
at least a part of the analysis unit comprises a neutral network, and the neutral network uses the learned library to identify the compound group to which the compound contained in the target sample belongs from the sample spectrum.

4. The spectral analysis device according to claim 1, wherein
the library is a mean library that comprises a mean spectrum obtained by averaging a group of known spectra, and
the analysis unit uses the mean library to identify the compound group to which the compound contained in the target sample belongs.

5. The spectral analysis device according to claim 1, wherein
the library is a small library composed of 100 or less of the group of known spectra, and
the analysis unit uses the small library to identify the compound group to which the compound contained in the target sample belongs.

6. The spectral analysis device according to claim 1, wherein
the measurement unit can perform mapping measurement by spectrometry, and
the analysis unit creates, in real time, a chemical image of the compound group contained in the target sample from a group of the sample spectrum obtained by mapping measurement.

7. The spectral analysis device according to claim 1, wherein
after identifying the compound group to which the target sample belongs by the spectral analysis device, spectral measurement is performed again to measure the complete spectrum, and the complete spectrum is used to identify a specific compound contained in the target sample at pinpoint.

8. The spectral analysis device according to claim 2, wherein
the library is a learned library that has machine-learned by teacher data in advance,
at least a part of the analysis unit comprises a neutral network, and the neutral network uses the learned library to identify the compound group to which the compound contained in the target sample belongs from the sample spectrum.

9. The spectral analysis device according to claim 2, wherein
the library is a mean library that comprises a mean spectrum obtained by averaging a group of known spectra, and
the analysis unit uses the mean library to identify the compound group to which the compound contained in the target sample belongs.

10. The spectral analysis device according to claim 2, wherein
the library is a small library composed of 100 or less of the group of known spectra, and
the analysis unit uses the small library to identify the compound group to which the compound contained in the target sample belongs.

11. The spectral analysis device according to claim 2, wherein
the measurement unit can perform mapping measurement by spectrometry, and
the analysis unit creates, in real time, a chemical image of the compound group contained in the target sample from a group of the sample spectrum obtained by mapping measurement.

12. The spectral analysis device according to claim 11, wherein
the measurement unit can perform mapping measurement by spectrometry, and
the analysis unit creates, in real time, a chemical image of the compound group contained in the target sample from a group of the sample spectrum obtained by mapping measurement.

13. The spectral analysis device according to claim 3, wherein
the neutral network comprises a convolutional neutral network.

14. The spectral analysis device according to claim 3, wherein
the library is a mean library that comprises a mean spectrum obtained by averaging a group of known spectra, and
the analysis unit uses the mean library to identify the compound group to which the compound contained in the target sample belongs.

15. The spectral analysis device according to claim 4, wherein
the measurement unit can perform mapping measurement by spectrometry, and
the analysis unit creates, in real time, a chemical image of the compound group contained in the target sample from a group of the sample spectrum obtained by mapping measurement.

16. The spectral analysis device according to claim 5, wherein
the measurement unit can perform mapping measurement by spectrometry, and
the analysis unit creates, in real time, a chemical image of the compound group contained in the target sample from a group of the sample spectrum obtained by mapping measurement.

17. The spectral analysis device according to claim 8, wherein
the neutral network comprises a convolutional neutral network.

18. The spectral analysis device according to claim 8, wherein
the library is a mean library that comprises a mean spectrum obtained by averaging a group of known spectra, and
the analysis unit uses the mean library to identify the compound group to which the compound contained in the target sample belongs.

19. A spectral analysis method by using a sample spectrum of a target sample measured by a measurement unit, and an analysis unit that analyzes the sample spectrum to identify a compound contained in the target sample, the method comprising steps of:
measuring a rough spectrum by the measurement unit, the rough spectrum being obtained earlier than obtaining a complete spectrum that can pinpoint the compound contained in the target sample,
classifying, by the analysis unit, the compound contained in the target sample to a compound group by using a library processed with an arithmetic processing before measuring the sample spectrum of the target sample, and
displaying, in real time, the compound group to which the compound belongs during measurement of the rough spectrum as an analysis progress or an analysis result to an analysis display part of the analysis unit,
wherein the complete spectrum is obtained by repeating integrations at least several times to pinpoint the compound, and the rough spectrum is obtained by fewer integrations than a number of the integrations for obtaining the complete spectrum.

20. A non-transitory computer-readable medium storing a computer-readable program that uses a sample spectrum of a target sample measured by a measurement unit to execute an analysis unit that identifies a compound contained in the target sample, the program causing the analysis unit to execute steps of:
measuring a rough spectrum obtained earlier than obtaining a complete spectrum that can pinpoint the compound contained in the target sample,
classifying, by the analysis unit, the compound contained in the target sample to a compound group by using a library processed with an arithmetic processing before measuring the sample spectrum of the target sample, and
displaying, in real time, the compound group that the compound belongs to during measurement of the rough spectrum as an analysis progress or an analysis result onto an analysis display part of the analysis unit,
wherein the complete spectrum is obtained by repeating integrations at least several times to pinpoint the compound, and the rough spectrum is obtained by fewer integrations than a number of the integrations for obtaining the complete spectrum.

* * * * *